A. C. BENNETT.
CARBURETER MANIFOLD.
APPLICATION FILED APR. 11, 1913.
1,133,528. Patented Mar. 30, 1915.
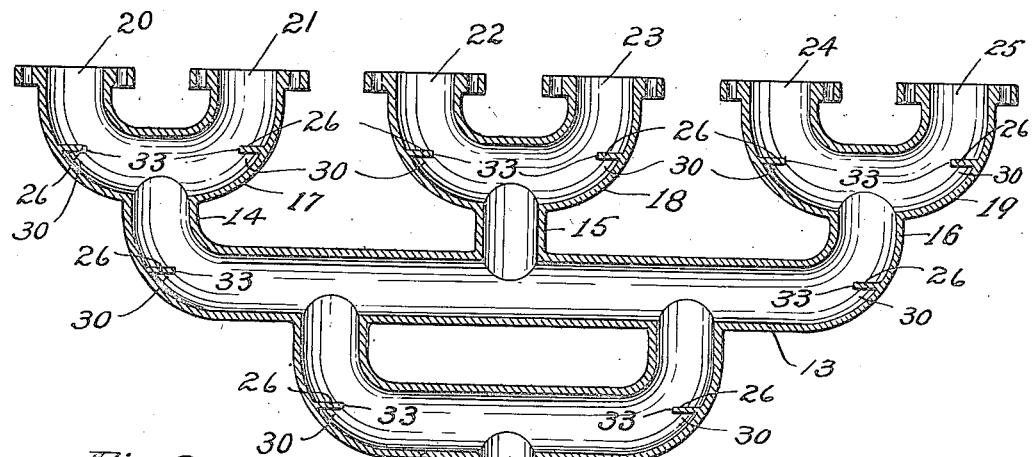
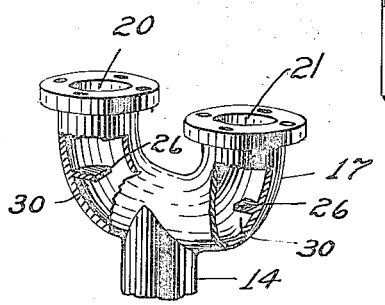
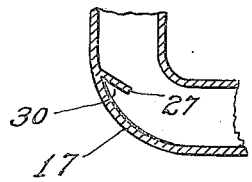
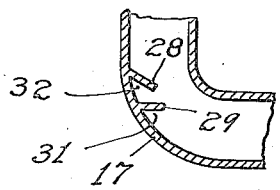

UNITED STATES PATENT OFFICE.

ASHLEY C. BENNETT, OF MINNEAPOLIS, MINNESOTA.

CARBURETER-MANIFOLD.

1,133,528.  Specification of Letters Patent.  Patented Mar. 30, 1915.

Application filed April 11, 1913. Serial No. 760,364.

*To all whom it may concern:*

Be it known that I, ASHLEY C. BENNETT, a citizen of the United States, residing at Minneapolis, in the county of Hennepin and State of Minnesota, have invented certain new and useful Improvements in Carbureter-Manifolds, of which the following is a specification.

My invention relates to carbureter manifolds for multiple cylinder gas engines and has for its object to provide in a manifold of such type means for catching and breaking up liquid which may condense and accumulate in the manifold pipes.

It is well known that in the operation of a gas engine, especially where heavy fuel oils are employed, there may be a condensation within the manifold pipes such as to cause a considerable accumulation of liquid which will run to the lower portion of the pipes; and when the engine is suddenly speeded up this acculation of liquid may be forced along the pipe walls and into the cylinder, causing waste and sometimes even flooding, and materially reducing the efficiency of the engine. I have found, if means are employed for damming or obstructing the forward movement of the film or layer of liquid in the pipes, that if said liquid passes over the damming means it will be so thrown into the current of the air through the pipes as to be broken up finely and more or less vaporized, going to the cylinder in a condition to be largely consumed in the explosion. This greatly increases the efficiency of the engine and permits the use of heavier oils than otherwise would be possible.

The full objects and advantages of my invention will appear in connection with the detailed description thereof and are particularly pointed out in the claims.

In the drawings, illustrating the application of my invention in one form,—Figure 1 illustrates a sectional side view of a manifold for a six-cylinder engine employing my improvements. Fig. 2 is a perspective view of a portion of a manifold with some parts broken away and in section to show the manner in which the dams or obstructions are formed. Figs. 3 and 4 are fragmentary sectional views showing modifications.

From the carbureter 10, which is indicated diagrammatically, extends a delivery pipe 11 which enters a manifold pipe 12 extending in both directions from delivery pipe 11. The two trunks of manifold pipe 12 in turn open into a more extended manifold pipe 13 which is provided with three feed trunks 14, 15 and 16, each delivering centrally into double cylinder feed pipes 17, 18 and 19, respectively, from which through openings 20, 21, 22, 23, 24 and 25 the explosive mixture is conducted to the cylinder of the engine. The above is the well-known manifold structure, being such that the stream of mixture from the carbureter and from each succeeding opening until the final openings at the cylinders are reached, drives against an unbroken pipe wall, insuring proper distribution.

It will be upon the lower surfaces of pipes 12, 13, 17, 18 and 19 that the accumulations of condensation will take place so as to produce a sufficient film or stream of liquid to be carried into the cylinders in such quantities as to cause loss of efficiency or deadening of the engine.

In the practice of my invention I form across the lower portions of said pipes, preferably adjacent the point where the same turn upwardly into a vertical limb, inwardly projecting, shelf-like members 26. These members are preferably placed horizontally in the pipes, and, as clearly shown in Fig. 2, comprise a segment bounded by a chord across the side of the pipe. The members 26 may readily be cast directly in the manifold pipes. Instead of extending the dams 26 horizontally from the walls of the pipe, said dams may be turned obliquely downward, as indicated at 27 in Fig. 4, or a downwardly-turned dam 28 may be used in conjunction with a horizontal dam 29, the latter preferably being somewhat shorter than dam 28, as shown. Whichever form is employed, a pocket 30 will be formed below the dam. In the form shown in Fig. 4, there will be a short pocket 31 below the short horizontal dam and a larger pocket 32 between the horizontal projection 29 and the oblique projection 28.

The operation of this device will be apparent. When the engine is running if condensation liquid accumulates within any of the pipes 12, 13, 17, 18 or 19, it will gravitate to the lower portions of said pipes and will be caused to travel along the same by the blast through the pipes. When, however, it reaches a pocket 30 back of the dams or obstructions 26 or 27, the progress of the liquid will be checked. When the pocket 30 or 32 has become filled with liquid it may pass over the edge 33 of a dam. Owing to the fact that the passage is somewhat restricted at such points by the dams 26 or 27, the speed of the air current will be greater there than elsewhere in the pipes and the liquid as it reaches the edge 33 will be subjected to the strongest part of this draft, which will have the effect of tearing or breaking up this liquid into comparatively fine vapor so that it may re-mix with the air in the pipes and become a part of the explosive mixture. Furthermore, since the dams 26 are placed above the curves of the pipes the accumulations of liquids in the pocket 30 will continually tend to gravitate back down the pipes between pulsations of the engine strokes, flowing well back whenever the speed of the engine slackens. This presents a large surface of the condensed liquid to the moving current of air and permits a large amount of re-vaporization.

The simplicity and high degree of utility of my invention will be obvious. When a manifold is used in which are the sets of dams herein described, practically no liquid masses of any appreciable size can get into the engine cylinders even when such heavy oils as kerosene are employed. Re-vaporization is continually taking place and when the engine is speeded up correspondingly increasing the speed of the currents in the manifold pipes, the liquid which otherwise would be drawn bodily into the engine cylinders is broken into a very fine spray or vapor as it is dragged over the edges 33 of the dams 26 or 27. As a result, the explosive mixture which enters the engine cylinders has the fuel oil all in a vapor form and thoroughly commingled with the air so that complete combustion of a high degree of efficiency results.

I claim:

1. A carbureter manifold comprising a series of delivery pipes having upwardly curved portions and a series of shelf-like dams in the pipes at the lower side of said upwardly curved portions to hold back condensation liquids.

2. A carbureter manifold comprising a series of delivery pipes having upwardly curved portions, and a series of shelf-like dams extending inwardly from the lower side of the upwardly curved portions of the pipes, said dams being formed integrally with the pipes and having a straight exposed edge therein.

3. A carbureter manifold comprising a series of delivery pipes having upwardly curved portions, and a series of horizontal, shelf-like partitions extending inwardly from the lower side of the upwardly curved portions of the pipes, said dams being formed integrally with the pipes and having a straight exposed edge therein.

In testimony whereof I affix my signature in presence of two witnesses.

ASHLEY C. BENNETT.

Witnesses:
F. W. WHITTLEY,
H. A. BOWMAN.